Jan. 23, 1968  J. S. JOHNSTON  3,365,654
CIRCUITS FOR CONTROLLING ELECTRICAL POWER
Filed June 9, 1964
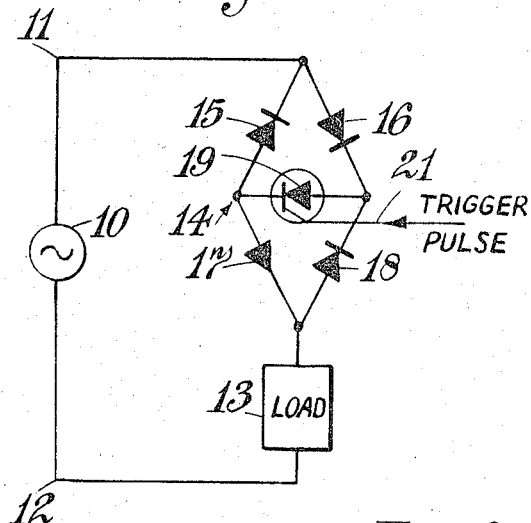
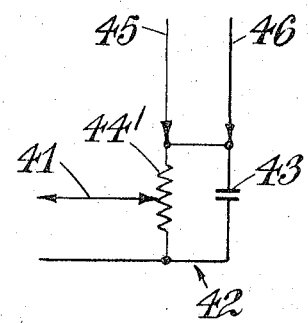
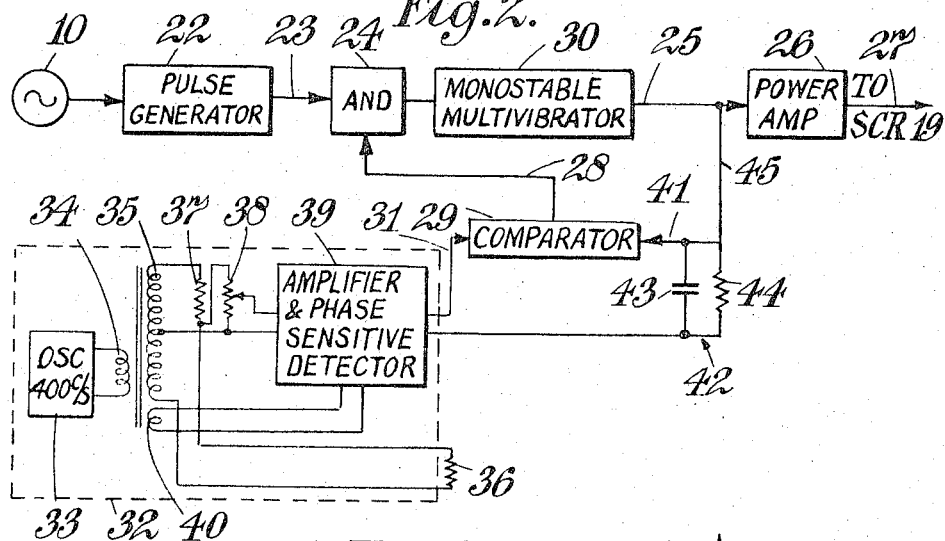
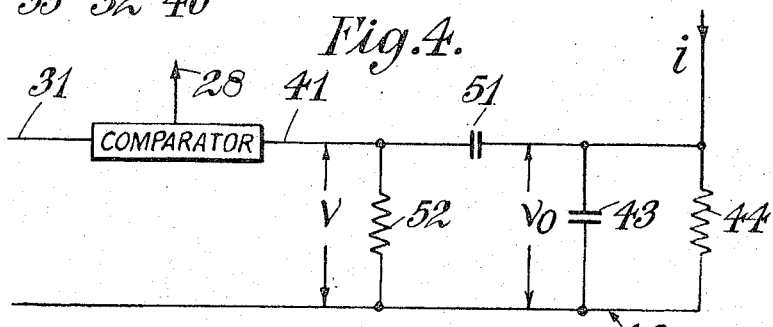
INVENTOR:
JAMES STEWART JOHNSTON
BY:
Dugger, Braddock, Johnson & Westman United States Patent Office 3,365,654
Patented Jan. 23, 1968

3,365,654
CIRCUITS FOR CONTROLLING
ELECTRICAL POWER
James Stewart Johnston, Bognor Regis, England, assignor to Rosemount Engineering Company Limited
Filed June 9, 1964, Ser. No. 373,756
11 Claims. (Cl. 323—22)

ABSTRACT OF THE DISCLOSURE

A circuit for controlling the mean electrical power fed to a load from a source of alternating current includes a generator for supplying trigger pulses at the start of integral half-cycles or cycles of the alternating current, a gate circuit for gating the trigger pulses, the gated trigger pulses being used to operate a silicon controlled rectifier acting as a power gate for the load so that pulses of power are fed to the load. The gate is controlled by a comparator which compares an input control signal, e.g. an error signal dependent on the required supply to the load, with a signal from an averaging circuit that averages the rate of pulses from the gate circuit. One or other of the inputs to the comparator may include proportional, integral and/or differential terms.

---

This invention relates to circuits for controlling the mean power fed to a load.

It is the common practice, when controlling an alternating current using triggered switching devices, such as silicon-controlled rectifiers, to adjust the phase of the trigger pulse in the cycle of the alternating supply to vary the proportion of the cycle in which the switching device is conductive. In such systems, the rapid switching gives rise to transients.

It is an object of the present invention to provide an improved control circuit which overcomes the problem of transients due to switching large currents.

According to this invention, a circuit for controlling the mean electrical power fed to a load in accordance with an input control signal comprises a trigger pulse generator, a gate circuit for gating the output of the trigger pulse generator, control means for feeding a pulse of power to the load in response to each trigger pulse passed by the gate circuit, an averaging circuit for giving an output signal dependent on the average rate of pulses from the gate circuit, an input pulse to the averaging circuit being given for each pulse from the gate circuit, and a comparator for controlling the gate circuit in accordance with a comparison between the output singal and the said control signal.

A control circuit according to the invention has particular application in control systems in which there are inherently long time constants: systems, for example, such as are used in the control of electrically powered heating circuits where the load may comprise one or more electrical heating elements. Conveniently the load is supplied by an alternating current supply, and the said control means comprises, in series with the load, a power gate circuit which, when triggered by a trigger pulse at the beginning of a half-cycle of current, presents a low impedance for the duration of that half-cycle, and unless triggered presents a high impedance. Preferably the power gate circuit comprises one or more silicon controlled rectifiers, to the control electrodes of which are applied the trigger pulses. By making the trigger pulses at the beginning of a half-cycle of current, that is when the current is zero, the switching transient is minimized. This is particularly important with silicon-controlled rectifiers because such devices are liable to damage from high peak-inverse voltages.

The number of half-cycles of current for which the power gate circuit conducts in a given time, and thus the average load current and the average heating effect is thus conveniently controlled by the rate of trigger pulses. The invention provides a circuit whereby the rate of trigger pulses may be controlled in accordance with an input control signal. Conveniently the said input control signal is an error signal representing a divergence of the temperature of the heated enclosure, as measured by a temperature sensor, form a predetermined level. The error signal may be derived from a bridge circuit having one variable circuit component controlled by the parameter and another circuit component adjustable in accordance with the predetermined level.

There follows, by way of example, a description of a control circuit according to the invention, in which description reference will be made to the accompanying drawing, of which:

FIGURE 1 is a circuit diagram showing the control means of the control circuit.

FIGURE 2 is a circuit diagram which shows the circuit wherefrom trigger pulses are derived for the control means of FIGURE 1;

FIGURE 3 is a circuit diagram of a modified portion of FIGURE 2, and

FIGURE 4 is a circuit diagram of a further modification of the circuit of FIGURE 2.

FIGURE 1 shows two terminals 11 and 12 of an alternating current supply source 10 of 240 volts R.M.S. and 50 cycles per second. A load 13 which comprises a number of heating elements is connected across the supply in series with a control circuit 14. In the particular arrangement described the load heats an enclosure (not shown) and the control circuit is for the purpose of controlling the heating in accordance with the temperature in the enclosure. The load current control means 14 of the control circuit comprises four rectifiers 15, 16, 17 and 18 connected in a full wave bridge rectifier configuration. A silicon-controlled rectifier 19 is connected across the output diagonal of the bridge rectifier circuit, so that a full-wave rectified alternating potential is applied across the silicon-controlled rectifier 19. A trigger pulse applied over a line 21 to the rectifier 19 will cause it to conduct if the voltage across it is sufficiently large, and the rectifier 19 will cease to conduct when the voltage across it has fallen to a particular value governed by the characteristics of the rectifier. When the rectifier 19 is conducting the rectifier bridge 14 has a low impedance and virtually the full supply voltage is applied to the load 13. When however, the rectifier 19 is not conducting the load 13 is virtually isolated from the supply and no heating effect is obtained. Thus if trigger pulses are applied over line 21 at the beginning of every half-cycle of the supply voltage across rectifier circuit 14, this rectifier circuit will conduct for virtually the whole of the time, and the load 13 will receive its maximum electrical supply. If the rectifier 19 is triggered at the beginning of only some of the half-cycles of the supply, the load 13 will receive proportionally less average current. In this way, by governing the number of trigger pulses which are supplied over line 21 in a given time, the average amount of power supplied to the load 13 can be controlled. The rectifier circuit 14 switches the power to the load 13 on and off at the beginning and end of the half-cycles of the alternating supply. At the instant of switching, the voltage of the supply is comparatively small, so that the problem of suddenly applying high currents to the inductive heater coils is avoided.

FIGURE 2 shows the circuit for generating trigger pulses and whereby the number of trigger pulses applied to rectifier 19 over line 21 is controlled. A pulse generator 22 has its input connected to the same supply to which the terminals 11 and 12 of FIGURE 1 are connected, and it is arranged to give an output pulse from its output over a line 23 every time the alternating voltage of the supply crosses zero. The frequency of the supply being 50 cycles per second, 100 pulses per second are applied over line 23 to the input of an "AND" gate 24 which, if open, passes the pulses applied at one of its inputs over a line 25 through a mono-stable multivibrator 30, to a power amplifier 26 and thence over a line 27 to line 21 of FIGURE 1. Opening and closing of the gate 24 is controlled by a signal which is applied over a line 28 to its other input from the output of a comparator 29.

The comparator 29 is provided with two inputs one of which, applied over a line 31, is an error signal representative of the difference between the temperature of the enclosure which is heated by the heating elements of the load 13 (FIGURE 1) and a preset temperature level. The error signal is derived from a controller 32 which comprises a 400 cycles per second oscillator 33 which supplies the primary winding 34 of a transformer having a centre-tapped secondary winding 35. Across the secondary winding 35 are connected a temperature sensitive resistor 36 and a balancing resistor 37. The two portions of the secondary winding 35 and the resistors 36, 37 form a bridge network. The junction of the resistors 36 and 37 is connected through a potentiometer 38 to the centre tap of the secondary winding 35. The wiper of the potentiometer 38 receives a potential with respect to the centre tap of the winding 35, which potential is amplified in an amplifier and phase sensitive detector 39 the output of which is demodulated in a manner which is sensitive to the phase of the signal at the input. This produces a direct voltage representative of the difference between the resistances of the two resistors 36, 37 and which is applied over line 31 to the first input of said comparator. A phase reference signal is supplied to the amplifier and phase sensitive detector 39 from a further secondary coil 40 of the transformer.

The temperature sensitive resistor 36 is placed in the enclosure which is warmed by the load 13 so that as the temperature in the enclosure rises the resistance of the resistor 36 increases and the potential at the junction of resistors 36 and 37 increases, resistor 37 being a balancing resistor which is not enclosed in the heated enclosure. The potential applied across potentiometer 38 is therefore representative of the temperature of the enclosure and an adjustable proportion of this potential is applied to the input of amplifier 39. The error signal over line 31 represents therefore a departure of the temperature in the enclosure from a preset temperature. The value of the preset temperature may be adjusted by the variation of the resistor 37 for instance.

In the comparator 29 the error signal over line 31 is compared with a signal derived over line 41 from an averaging circuit 42 by connecting the output from the averaging circuit to the other input of said comparator either directly as illustrated in FIGURE 2 or through additional circuitry such as the modification depicted in FIGURE 4. The averaging circuit 42 consists of a parallel combination of a capacitor 43 and a resistor 44. The input signal to the averaging circuit is applied across the parallel combination by means of a line 45 connected to the output line 25 of the "AND" gate 24. The averaging circuit 42 averages, over a length of time dependent upon the CR time constant of the circuit, the number of output pulses which are applied to trigger the silicon controlled rectifier 19 of FIGURE 1. If the average signal applied over line 41 is less than the error signal over line 31 the comparator 29 will give a signal over line 28 to open the "AND" gate 24 and provide more trigger pulses over line 25 and thus to rectifier 19. However, as soon as the average signal over line 41 reaches the value of the error signal over line 31 the signal will be cut off from line 28 and the "AND" gate will be closed. The "AND" gate will remain closed until such time as the potential on line 41 has decayed sufficiently to switch the comparator and provide a switching signal to open the "AND" gate 24.

The average number of trigger pulses which is applied in a given time to trigger the silicon controlled rectifier 19 is controlled in accordance with the error signal over line 31. The comparator 29, the multivibrator 30, "AND" gate 24 and averaging circuit 42 constitute a closed control loop within the control system, which closed loop ensures that the average rate of trigger pulses applied to the silicon controlled rectifier 19, and thus the average current through the load 13, closely accords with the required value indicated by the error signal over line 31. Rapid and accurate control is provided since, in the establishment of the requisite number of trigger pulses per unit time, the inherently long time delays associated with the heating elements of load 13 and the temperature sensing mechanism of controller 32 are avoided. It is not necessary for the time taken for the temperature in the enclosure to rise or fall by the requisite amount to elapse before correction is applied to the average rate of trigger pulses.

The monostable multivibrator 30 acts as a pulse shaper, giving a pulse of closely defined amplitude and duration whatever the shape of the gated trigger pulse. The multivibrator also introduces a short delay into the closed control loop, so that the comparator 29 causes the gate 24 to remain open until the trigger pulse is over.

The gain of the control loop is controlled by the potentiometer 38. On account of the various inevitable thermal lags in the process under control, there will be a danger of the control loop becoming unstable. The gain of the loop is reduced to a value below that at which instability occurs.

In an alternative embodiment, the gain control is incorporated in a modified averaging circuit 42, shown in FIGURE 3. The lead 41 from one input of the comparator 29 is connected to the tap of a potentiometer 44' parallel with a capacitor 43. The line 45 applies one input signal to the averaging circuit across the parallel combination 43, 44'. A second input signal applied by means of a line 46 across the parallel combination comprises a D.C. signal derived from changes in the mains voltage. With this arrangement, the control loop can compensate rapidly for a change in the mains supply. The D.C. signal is so derived from changes in the supply voltage that a reduction in mains voltage reduces the voltage across the averaging circuit 42 and a higher pulse frequency on lead 45 is required to restore the original value. When the arrangement of FIGURE 3 is used the wiper of the potentiometer 38 may be fixed.

The voltage V across the output of the averaging circuit 42 is related to the average pulse current $i$ by the equation $$i = \frac{V}{R_1} + C_1 \frac{dV}{dt} \quad (1)$$

where $C_1$ is the capacitance 43 and $R_1$ is the resistance 44. The constant of proportionality between V and $i$ may be altered by adjustment of $R_1$, which may be a potentiometer as shown in FIGURE 3. For example, if $i$ is limited to 1 microamp, for a voltage difference V of 1 volt, $R_1$ must be 1 megohm and, for a voltage change of 1 volt in 5 minutes, $C_1$ must be 300 microfarads.

The Equation 1 shows $i$ is dependent on V and its time derivative. Alternatively $i$ can be made dependent on the time integral of V by a modification to the averaging circuit 42 as shown in FIGURE 4. A shunt arm containing a further capacitor 51 ($C_2$) and resistor 52 ($R_2$) is connected across capacitor 43 and the output voltage from the averaging circuit 42 is taken from across the resistor 52.

Assuming $C_1$ is small enough to be neglected, and that the current flowing in $C_2$ is small compared with that in $R_1$, $i$ is related to V by the equation $$i = \frac{V}{R_1} + \frac{1}{R_1 R_2 C_2} \int V dt \qquad (2)$$

Equation 2 shows that under certain conditions $i$ is dependent on V and its time integral.

If $C_1$ is not small enough to be neglected, the average pulse current is also dependent on the time derivative of V. The current flowing in $C_1$ is $$C_1 \frac{dV_o}{dt}$$

where $V_0$ is the voltage across $C_1$, and $$V_o = V + \frac{1}{R_2 C_2} \int V dt \qquad (3)$$

The current in $R_1$ is given by Equation 2, so that the total current $$i = \frac{V}{R_1} + \frac{1}{R_1 R_2 C_2} \int V dt + C_1 \frac{dV}{dt} + \frac{C_1}{R_2 C_2} V$$

$$= \frac{1}{R_1} \left[ V \left( 1 + \frac{R_1 C_1}{R_2 C_2} \right) + \frac{1}{R_2 C_2} \int V dt + R_1 C_1 \frac{dV}{dt} \right] \qquad (4)$$

If $C_1 R_1$ is very much less than $C_2 R_2$, the magnitude of the proportional term in Equation 4 may be altered by adjusting $R_1$. The relation of the integral and derivative terms to the proportional term may be altered by adjustment of $R_2$ (or $C_2$) and $C_1$ respectively without interaction.

If the time constant $R_2 C_2$ is 50 minutes, $R_2$ might be 10 megohms and $C_2$ 300 microfarads. When $R_2 C_2$ is 50 minutes, the pulse frequency changes by its maximum amount 50 minutes after the maximum value of V is applied to the comparator 29.

Equations 2 and 4 are true only when the current flowing in $C_2$ is small compared with that in $R_1$. This condition can be fulfilled by inserting a buffer stage, such as an emitter follower, to apply the voltage across resistor 44 to capacitor 51.

The invention is not restricted to the details of the foregoing description of one embodiment thereof which is provided by way of example only. For instance, the invention may be employed in control systems for the control of parameters other than temperature. The signal applied to the comparator may be any desired function of the error voltage. In particular, it may comprise signals proportional to the integral of the error signal with respect to time and/or signals proportional to the first and higher derivatives of the error signal with respect to time. These conditions may be achieved by inserting suitable circuits in line 31 of FIGURE 2 and are important in achieving system stability under difficult control conditions.

If it is required that the rectifier 19 be switched for integral multiples of whole cycles of the supply voltage, a divide-by-two circuit is included in the line 45 so that for every two pulses on line 25 one pulse reaches the averaging circuit.

I claim:

1. A control circuit for controlling the mean electrical power fed to a load in accordance with an input control signal comprising a trigger pulse generator, a gate circuit having a pair of inputs and an output, one of said inputs being connected to the output of the trigger pulse generator, control means for feeding a pulse of power to the load in response to each trigger pulse passed by the gate circuit, a pulse being passed by said gate circuit only when said pulse generator delivers a trigger pulse to said one input and a second signal is applied to the other of said inputs, an averaging circuit having its input connected to the output of said gate circuit for giving an output signal dependent on the average rate of pulses from the output of said gate circuit, an input pulse being delivered to the averaging circuit for each pulse from the output of said gate circuit, and a comparator having a pair of inputs and an output, one of said comparator inputs being connected to the output of said averaging circuit and the other input of said comparator having applied thereto said control signal and the output of said comparator being connected to the other of said inputs of the gate circuit to apply said second signal thereto for controlling the gate circuit in accordance with a comparison between the output signal from said averaging circuit and the said control signal to govern the number of trigger pulses passed by said gate circuit in a given unit of time.

2. A control circuit for controlling the mean electrical power fed to a load from an alternating current supply in accordance with an input control signal comprising a trigger switched power gate circuit in series with the load in the alternating supply circuit, a trigger pulse generator controlled by said alternating supply to produce trigger pulses at the beginning of half cycles of the alternating current, a trigger control gate circuit for gating the output of the trigger pulse generator, said trigger control gate circuit having a pair of inputs and an output, one of said inputs being connected to the output of said pulse generator, means for applying the gated trigger pulse from the output of said trigger control gate circuit to said power gate circuit to feed a power pulse to the load for each trigger pulse passed by the gate circuit, an averaging circuit having its input connected to the output of said trigger control gate circuit, said averaging circuit being arranged to give an output signal at its output dependent on the average rate of pulses from the trigger control gate circuit, and a comparator having a pair of inputs and an output, one of said comparator inputs being connected to the output of said averaging circuit and the other input of said comparator having applied thereto said control signal and the output of said comparator being connected to the other of said inputs of the trigger control gate circuit to apply said second signal thereto for controlling the trigger control gate circuit in accordance with a comparison between said output signal from said averaging circuit and said input control signal to govern the number of trigger pulses passed by said gate circuit in a given unit of time.

3. A control circuit as claimed in claim 2 wherein the power gate circuit comprises at least one silicon controlled rectifier having a control electrode to which the gated trigger pulses from the trigger control gate circuit are applied.

4. A control circuit for controlling the mean electrical power fed to a load from an alternating current supply in accordance with the divergence of a parameter from a predetermined level comprising transducer means responsive to said parameter to produce a control signal representing the divergence of said parameter from said predetermined level comprising a trigger switched power gate circuit in series with the load in the alternating supply circuit, a trigger pulse generator controlled by said alternating supply to produce trigger pulses at the beginning of half cycles of the alternating current, a trigger control gate circuit having a pair of inputs and an output, one of said inputs being connected to the output of the trigger pulse generator, means for applying the gated trigger pulse generator, means for applying the gated trigger pulse output from said trigger control circuit to said power gate circuit to feed a power pulse to the load for each trigger pulse passed by the gate circuit, an averaging circuit having its input connected to the output of said trigger control gate circuit, said averaging circuit being arranged to give an output signal dependent on the average rate of pulses from the trigger control gate circuit, and a comparator having a pair of inputs and an output, one of said comparator inputs being connected to the output of said averaging circuit and the other input of said comparator having applied thereto said control signal and the output of said comparator being connected to the other of said inputs of the trigger control gate circuit to apply said second signal thereto for controlling the trigger control gate circuit in accordance with a comparison between said output signal from said averaging circuit and said control signal to govern the number of trigger pulses passed by said gate circuit in a given unit of time.

5. A control circuit as claimed in claim 4 wherein the error signal is derived from a bridge circuit having one variable circuit component controlled by the parameter and another circuit component adjustable in accordance with the predetermined level.

6. A control circuit as claimed in claim 1 wherein means are provided for adding, to one of the input signals to said comparator, an integral of that input signal.

7. A control circuit as claimed in claim 1 wherein means are provided for adding, to one of the input signals to said comparator, a derivative of that input signal.

8. A control circuit as claimed in claim 2 wherein means are provided responsive to changes in the voltage of said supply to modify one input signal to the comparator so as to compensate for such voltage changes.

9. A control circuit as claimed in claim 8 wherein the averaging circuit comprises a capacitor and resistor in shunt and wherein said means responsive to changes in the voltage of said supply are arranged to apply a direct voltage input signal to said averaging circuit.

10. A control circuit as claimed in claim 2 wherein said comparator has an input circuit to which said output signal is applied, which input circuit includes an integrating network for adding an integrated component to said output signal.

11. A control circuit as claimed in claim 2 wherein said comparator has an input circuit to which said output signal is applied, which input circuit includes a differentiating network for adding a derivative component to said output signal.

References Cited

UNITED STATES PATENTS

| 3,204,172 | 8/1965 | Darling et al. | 321—18 |
| 3,272,991 | 9/1966 | Lutsch | 323—22 |
| 3,240,948 | 3/1966 | Burley | 323—22 |
| 3,240,916 | 3/1966 | Bray et al. | 323—22 |
| 3,239,748 | 3/1966 | Berglund | 323—22 |

JOHN F. COUCH, *Primary Examiner.*

M. L. WACHTELL, H. HUBERFELD,
*Assistant Examiners.*